United States Patent [19]

Reeves

[11] 4,360,309
[45] Nov. 23, 1982

[54] HYDRAULIC CYLINDER WITH SPHERICAL BEARING MOUNT

[75] Inventor: Jerry L. Reeves, Dallas, Oreg.

[73] Assignee: Towmotor Corporation, Mentor, Ohio

[21] Appl. No.: 138,040

[22] PCT Filed: Feb. 7, 1980

[86] PCT No.: PCT/US80/00129

§ 371 Date: Feb. 7, 1980

§ 102(e) Date: Feb. 7, 1980

[87] PCT Pub. No.: WO81/02290

PCT Pub. Date: Aug. 20, 1981

[51] Int. Cl.³ ............................................. B66F 9/00
[52] U.S. Cl. ..................................... 414/671; 92/118; 308/72
[58] Field of Search ................. 414/671, 669; 308/72, 308/126; 92/167, 165 R, 118; 180/9.5; 172/795

[56] References Cited

U.S. PATENT DOCUMENTS

| | | | |
|---|---|---|---|
| 1,747,968 | 2/1930 | Braven | 92/167 |
| 3,166,207 | 1/1965 | Quayle | 414/667 |
| 3,184,088 | 5/1965 | Berge | 414/667 |
| 3,311,030 | 3/1967 | Halstead | 92/165 R |
| 3,819,078 | 6/1974 | Walsh | 414/671 |
| 3,923,349 | 12/1975 | Herbst | 308/72 |
| 3,980,149 | 9/1976 | Blomstrom et al. | 180/9.5 |
| 4,031,967 | 6/1977 | Atherton et al. | 92/118 |
| 4,125,199 | 11/1978 | Abels et al. | 414/671 |

FOREIGN PATENT DOCUMENTS

| | | | |
|---|---|---|---|
| 716425 | 8/1965 | Canada | 414/667 |
| 2726147 | 12/1978 | Fed. Rep. of Germany | 414/667 |

Primary Examiner—John J. Love
Assistant Examiner—L. E. Williams
Attorney, Agent, or Firm—Phillips, Moore, Lempio & Majestic

[57] ABSTRACT

A hydraulic cylinder mount assembly (50) for a cylinder (42) having first and second ends (52,64) includes a spherical load bearing surface (96) located at one of said first and second ends (52,64), which has a diameter (98) which is less than the diameter of the cylinder housing (100). Accordingly, the mount assembly (50) is smaller and more compact than prior art mounts and the cylindrical load bearing surface (96) allows the hydraulic cylinder (42) to pivot with three degrees of freedom so as to avoid any bending moments or other stresses. The mount can be used to mount hydraulic cylinders for a carriage (14) of a lift truck (10) so as to afford an overall compact design.

4 Claims, 5 Drawing Figures

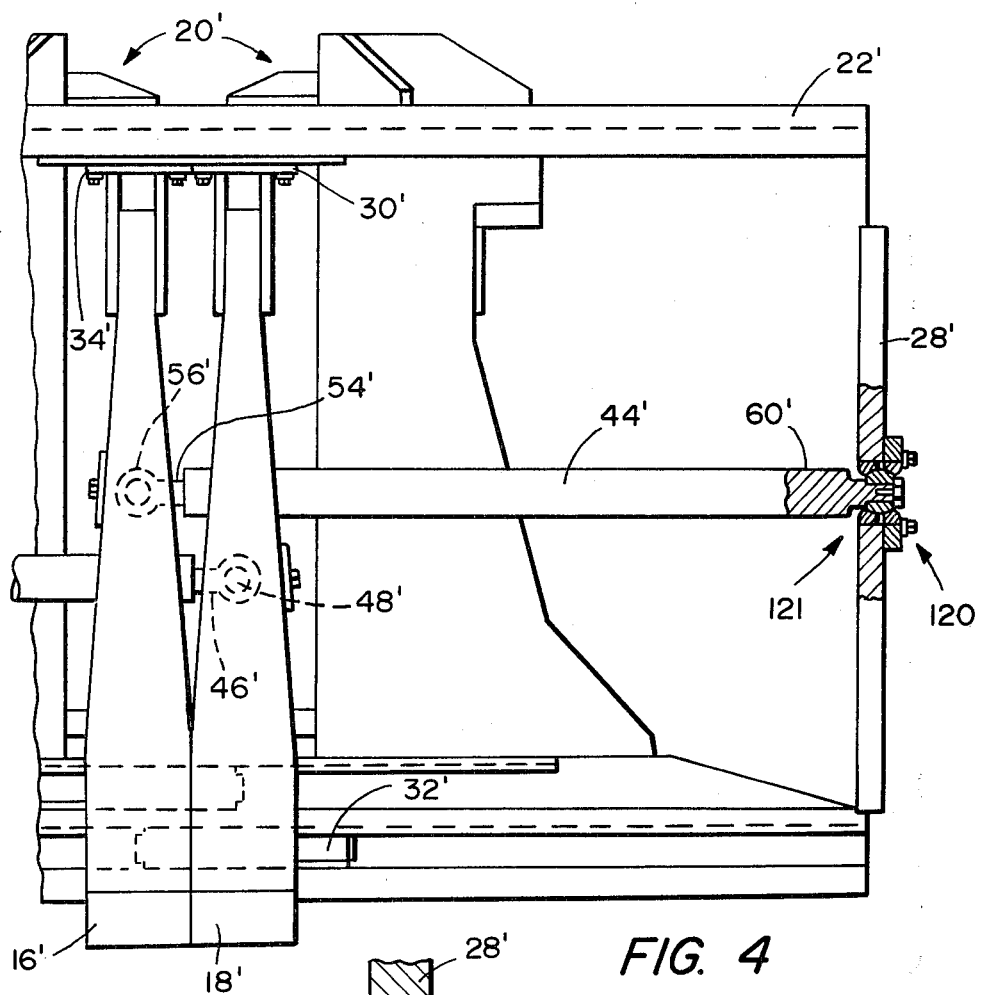
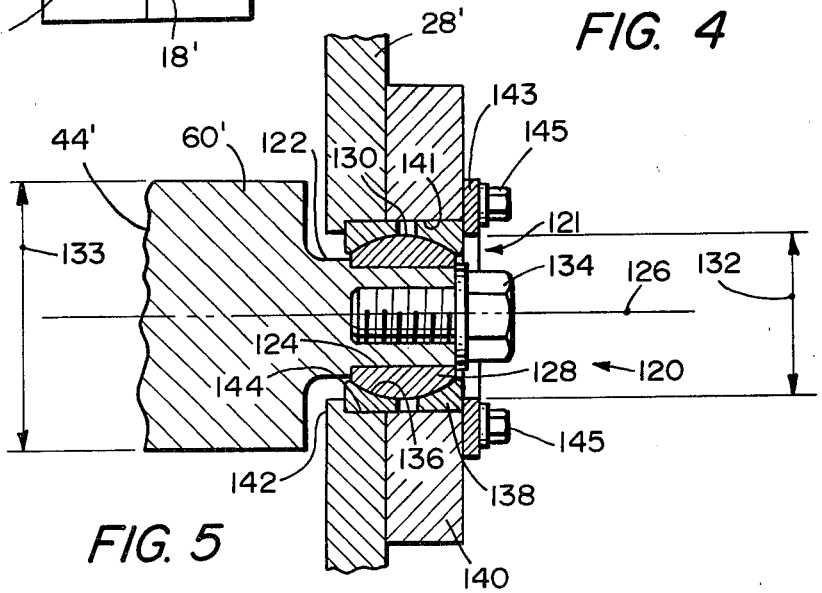

HYDRAULIC CYLINDER WITH SPHERICAL BEARING MOUNT

DESCRIPTION

1. Technical Field

The present invention is related to hydraulic cylinder mounts.

2. Background Art

Present side shiftable carriage assemblies for lift trucks include a first carriage which is mounted to a mast and a second carriage which is mounted on and side-shiftable via hydraulic cylinders with respect to the first carriage. Such an arrangement places the load carried by the lift truck further forward from the center of gravity of the truck than would normally occur with a lift truck having a single non-side-shiftable, carriage. Accordingly, the lift truck with the side shiftable carriage is unable to lift as large a load the truck with the non-side-shiftable carriage owing to that increased distance. Thus, there is a need to provide the side-shift capability while keeping the load as close as possible to the center of gravity of the lift truck.

One solution to this problem has been to mount forks for the lift truck directly to a single carriage which is mounted to the mast, and then to actuate the forks with hydraulic cylinders to provide shifting of the load relative to the carriage. In the first presented side-shiftable carriage assembly, due to the depth of both the first and second carriages, the hydraulic cylinders, using conventional cylinder mounts, can be conveniently housed between the carriages. However, with the mounting of the forks directly onto a single carriage, the depth of the carriage assembly is reduced and the conventional hydraulic cylinder mounts are too large to be used economically and efficiently.

One traditional cylinder mount includes a trunnion mount, which is generally located about the cylinder, midway along the length thereof, and which allows the hydraulic cylinder to pivot about a transverse axis. As previously indicated, this mount is too bulky when incorporated in a carriage having the forks mounted side-slidably on a single carriage. Further, since the trunnion mount only allows the cylinder to pivot about a transverse axis, the cylinder must be sufficiently massive and sturdy to resist bending forces perpendicular to the transverse axis.

Another type of cylinder mount includes a bifurcated end mount located at the head end of the cylinder and adapted to receive a member extending from the carriage. A pin is provided through the bifurcated end to pivotally mount the bifurcated end to the members extending from the carriage. The axis of the pin is substantially perpendicular to the axis of the cylinder and allows the cylinder to pivot about a transverse axis. The rod end of the cylinder is affixed to the fork to be actuated. Such an arrangement has all the disadvantages of the above trunnion mounts.

Another prior art cylinder mount is disclosed in U.S. Pat. No. 4,031,967 issued to Robert Allen Atherton et al. on June 28, 1977. This mount includes a spherical bearing mount located about the cylinder housing. Accordingly, the mount is large and would be inappropriate for the above carriage and fork arrangement.

The present invention is directed to overcoming one or more the problems as set forth above.

DISCLOSURE OF THE INVENTION

In one aspect of the present invention, a mount assembly for a cylinder having a housing with an axis and first and second ends and a predetermined diameter comprises a bracket located adjacent to the cylinder and a mount having a spherical load bearing surface having a diameter that is less than the predetermined diameter and an axis positioned generally in line with the axis of the housing. The mount is held in the bracket and is connected to one of the first and second ends.

In another aspect of the invention, the cylinder has a rod extending from one of the first and second ends of the housing and the mount is positioned about the rod.

The present invention is more compact than prior art devices as it is located at an end of the cylinder housing and has a diameter which is less than the cylinder housing. The mount having a spherical load bearing surface allows three degrees of freedom, and thus the cylinder is self-centering, so that as bending moments and stresses are placed on the cylinder due to loading of the forks, the cylinder can move to align and relieve the bending moments and stresses. The construction of the cylinder housing and rod do not have to be as massive and sturdy as would be necessitated if the cylinder had to absorb such bending moments and stresses. This being the case, the overall diameters of the rod and cylindrical housing are reduced and the cylinder and mount can be even more compact.

In an aspect of the apparatus of the invention, a mast for a lift truck has a carriage, a side-shiftable load carrying fork, means for mounting the fork to the carriage, a cylinder having a housing with an axis and a predetermined diameter and first and second ends. The improvement comprises a bracket affixed to said carriage and a mount including a spherical load-bearing surface having a diameter that is less than the predetermined diameter of the cylinder and positioned generally in line with the axis of said housing. The mount is held in said bracket. The mount is connected to one of the first and second ends. This aspect of the apparatus of the invention has all of the advantages as described hereinabove and allows the carriage and the load held thereby to be closer to the center of gravity of the lift truck to which the mast is affixed than does the prior art. Accordingly, a larger load can be carried than would be possible if the load were held farther from the center of gravity of the lift truck.

BRIEF DESCRIPTION OF THE DRAWINGS

FIG. 4 is a diagrammatic partial front elevational view, partially sectioned, of a carriage with an alternate embodiment of a hydraulic cylinder mount assembly of the present invention.

FIG. 5 is a diagrammatic cross-sectional view of the alternate embodiment of the hydraulic cylinder mount assembly of the present invention as depicted in FIG. 4.

BEST MODE OF CARRYING OUT THE INVENTION

Figure 1:
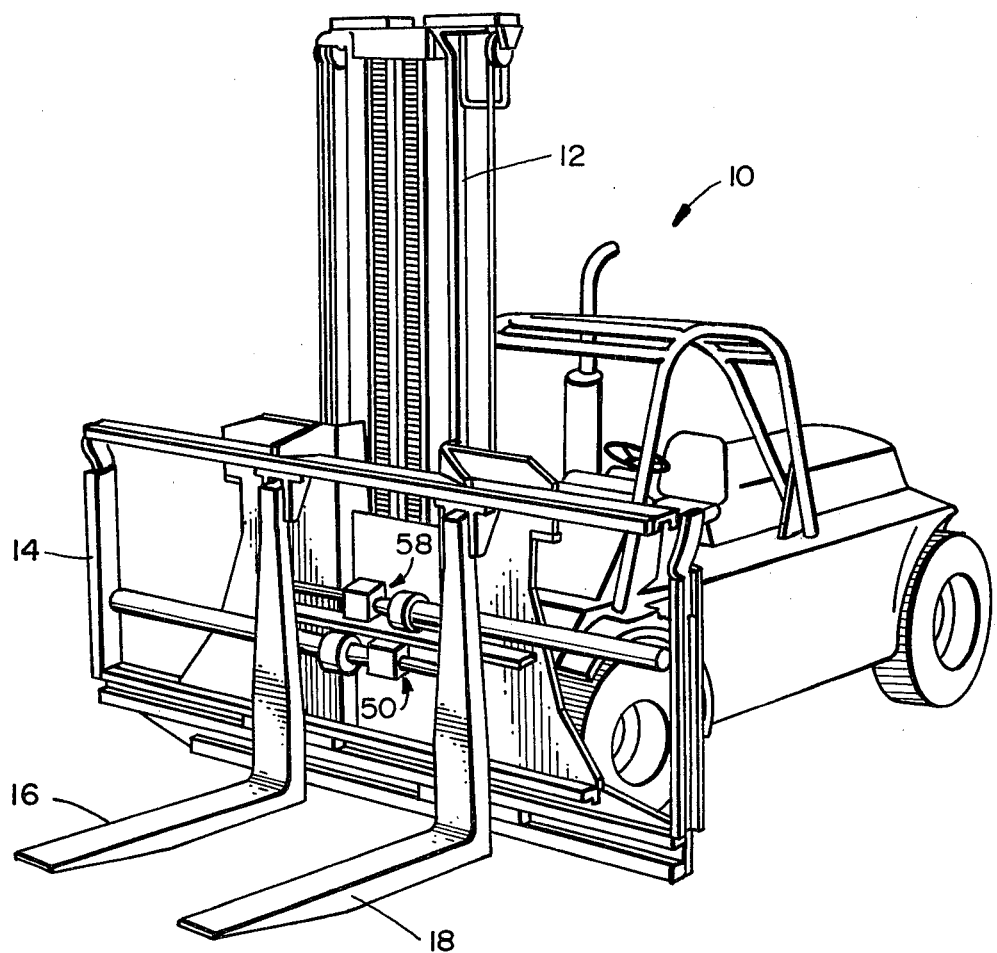
FIG. 1 is a diagrammatic perspective view of a lift truck incorporating an embodiment of the hydraulic cylinder mount of the present invention.
Figure 2:
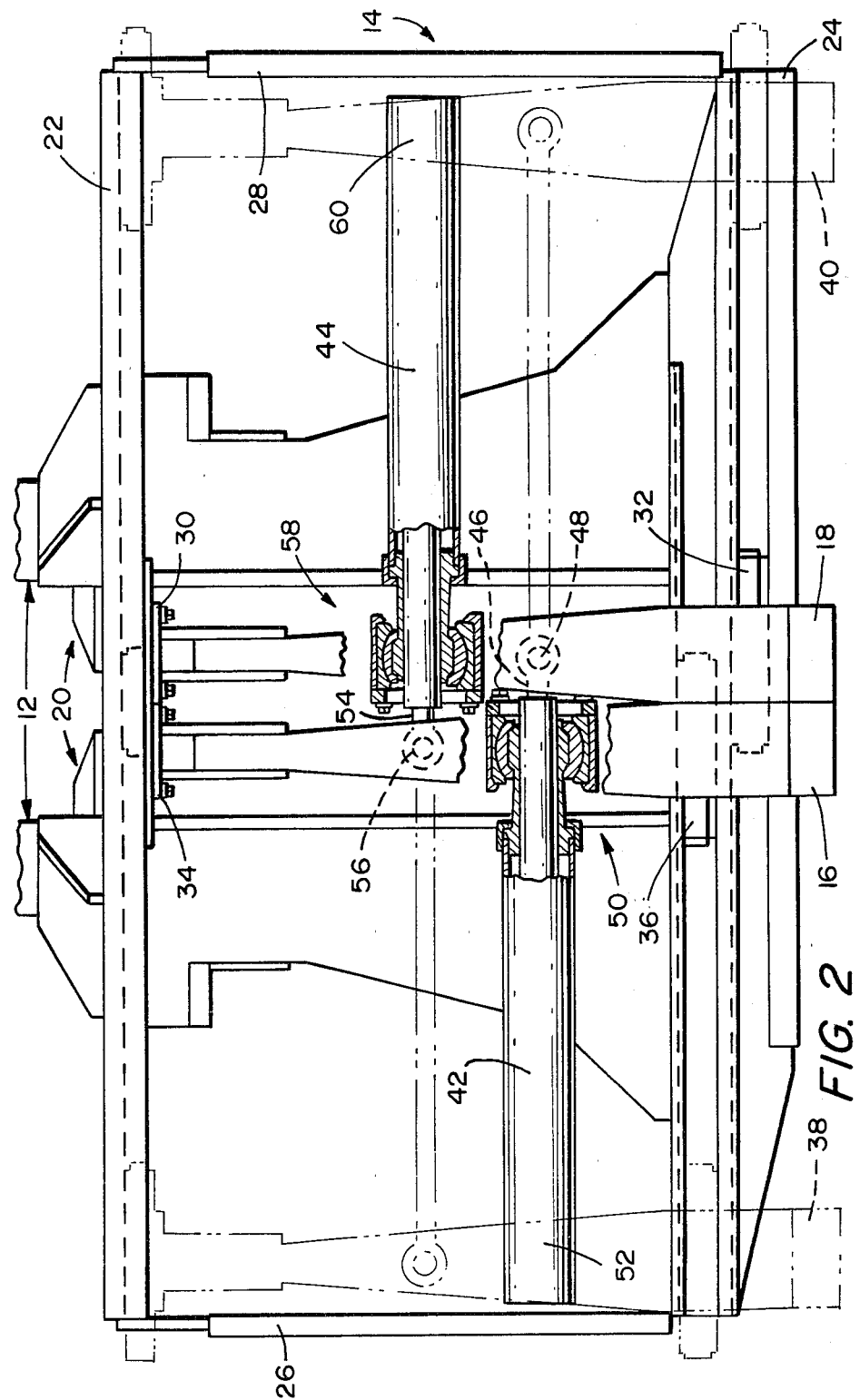
FIG. 2 is a diagrammatic front elevational view, partially cut away and sectioned, of the carriage depicted in FIG. 1 and the embodiment of the hydraulic cylinder mount assembly of the present invention.

With reference to FIG. 1, a lift truck 10 is depicted having a mast 12 with a carriage 14 movably mounted thereon. Side-slidably mounted on the carriage 14 are first fork 16 and second fork 18. Turning to FIG. 2, a front elevational view of the carriage 14 is depicted with the forks 16 and 18 shifted to positions adjacent each other and in the middle of carriage 14.

Carriage 14 includes frame structure 20 which is movably mounted to the mast 12 and has upper and lower horizontal rails 22 and 24 that are interconnected by vertical end members 26 and 28. Mounts 30 and 32 slidably secure second fork 18 to upper and lower rails 22 and 24, respectively, and mounts 34 and 36 slidably secure first fork 16 to the upper rail and lower rail 22 and 24, respectively. Fork 16 is slidable from a substantially middle carriage position, located immediately adjacent to second fork 18, to a leftward end position shown in phantom and identified with the numeral 38. Similarly, second fork 18 is movable to a rightward end position shown in phantom and identified by the numeral 40.

The movement of first and second forks 16 and 18 as indicated above is accomplished by hydraulic cylinders 44 and 42, respectively. A rod 46 of hydraulic cylinder 42 is pivotally pinned to second fork 18 by pin 48 and is mounted to frame structure 20 by hydraulic cylinder mount 50 of the invention. The head end 52 of hydraulic cylinder 42 is unsecured and free to move. Similarly, a rod 54 of hydraulic cylinder 44 is pivotally secured to first fork 16 by pin 56 and is mounted to frame structure 20 by hydraulic cylinder mount 58 of the invention. The head end 60 is free to move in the same manner as head end 52.

Figure 3:
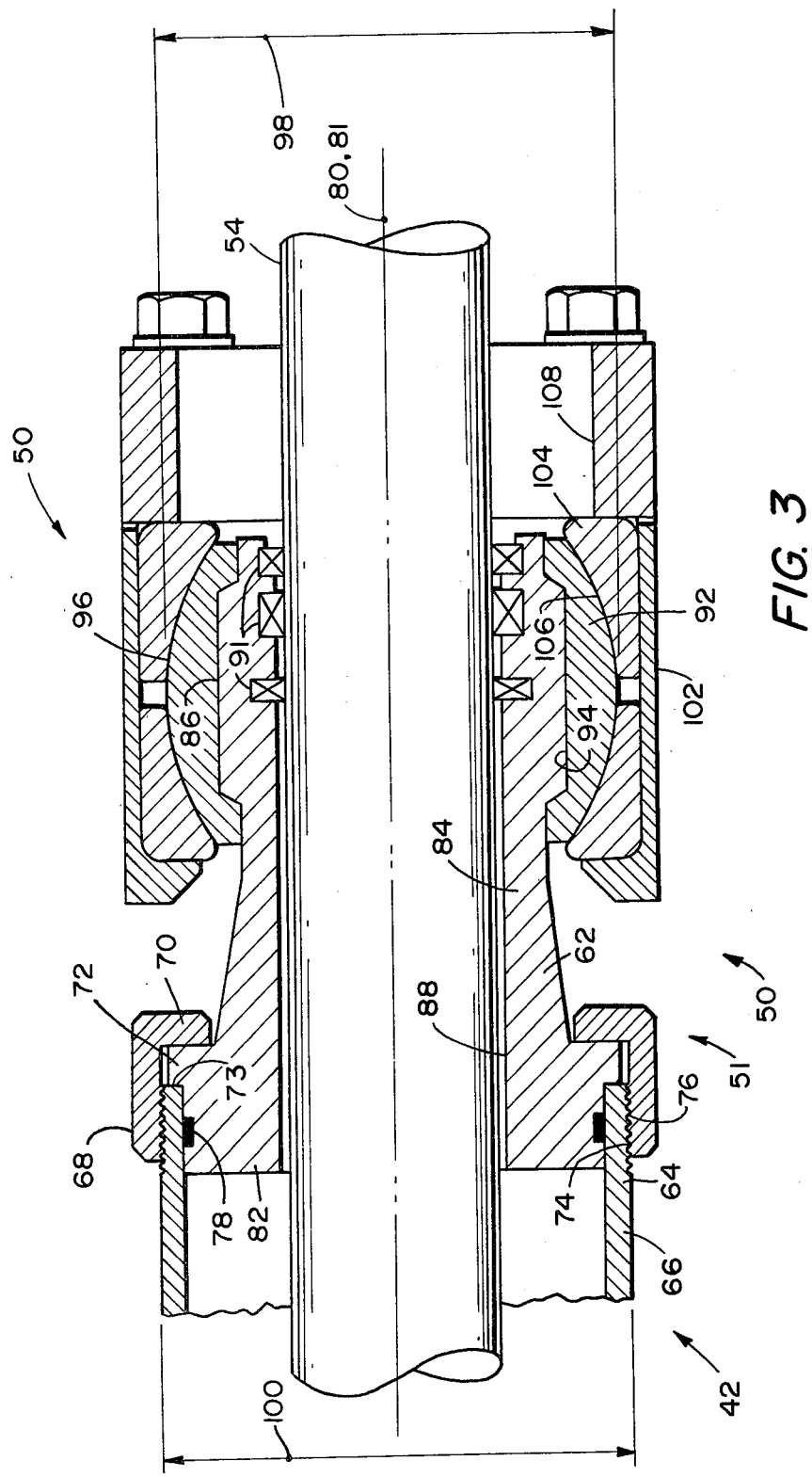
FIG. 3 is a diagrammatic cross-sectional view of the embodiment of the hydraulic cylinder mount assembly of the present invention as depicted in FIG. 2.

Turning to FIG. 3, a cross-sectional view of the hydraulic cylinders mount assembly 50 of the invention is depicted. It is to be understood that the following description applies equally well to hydraulic cylinder mount assembly 58. Hydraulic cylinder mount assembly 50 includes a mount 51 having a cylinder rod endcap 62, which is secured to the rod end 64 of housing 66 of the cylinder 42 by an annulus 68 which has a lip 70. Lip 70 retains an annular flange 72 of cylinder plug portion 82 of endcap 62 against end 73 of cylinder housing 66, with internal threads 74 of annulus 68 engaging external threads 76 of housing 66. An O-ring or other type of gasket 78 is located on the external surface of plug 82, adjacent to flange 72 and is compressed between housing 66 and end cap 62 to provide a fluid seal.

Endcap 62 has cylindrical symmetry about an axis 80 coincident with the axis 81 of the cylinder 42. End cap 62 additionally includes a conical neck portion 84 which extends from plug 82 and an annular land 86 secured to neck portion 84 and positioned distally from plug 82. Rod endcap 62 further defines a longitudinal bore 88 having an axis 81 coincident with axis 80, which accommodates the rod 54. A plurality of seals 90 are located in grooves 91 defined in bore 88 and are compressibly held between rod 54 and rod endcap 62. A load bearing 92, which has three pieces or is split for assembly, has an annular groove 94 which accepts land 86. Load bearing 92 defines a truncated, convex spherical load bearing surface 96, which has a diameter 98 which in a preferred embodiment is less than the diameter 100 of the hydraulic cylinder 42. It is to be understood that alternatively diameter 98 can be equal to or larger than diameter 100. Further, the axis of symmetry of spherical surface 96 is coincident with axis 80.

Mount assembly 50 includes a bracket 102 with a load bearing 104 which defines a truncated, spherically concave surface 106 which accepts convex spherical surface 96. Bracket 102 is mounted to frame structure 20 by welding or other means known in the art. Bracket 102 defines a bore 108 through which rod 54 extends. Bore 108 allows rod 54 to have three degrees of freedom of motion as spherical surface 96 pivots on spherical surface 106.

Industrial Applicability

The operation of the hydraulic cylinder mount assembly 50 of the invention is as follows. With spherical load bearing surface 96 mounted on bracket 102, the rod endcap 62 and thus the entire cylinder 92, is free to pivot universally with three degrees of freedom on load bearing 104. Accordingly, any force applied to the fork, tilting it forwardly, rearwardly or sideways will cause said cylinder 42 to pivot to self-align itself with respect to the new position of the fork 18 to avoid bending moment (on the rod 54). That being the case, the hydraulic cylinder 42, including the housing 66 and rod 54, does not have to be designed to accept such bending moments, and thus can be smaller than would normally be necessary. Thus, the hydraulic cylinder mount 50 and cylinder 42 can be small enough so that they can conveniently fit in the carriage 14.

With the hydraulic cylinder 42 being more compact, the carriage 14 can be more compact and thus the load carried by the forks 16 and 18 can be held closer to the center of gravity. Accordingly, the load can be larger than that which could be carried by prior devices.

It is to be understood that hydraulic cylinder mount assembly 58 operates in essentially the same way as described hereinabove.

Alternate Embodiment

An alternate embodiment of the hydraulic cylinder mount assembly of the invention is depicted in FIGS. 4 and 5 and identified by the numeral 120. It is to be understood that elements in FIGS. 4 and 5 which are identical to those in FIG. 2 are given the same numerical designation followed by a prime, and that a hydraulic cylinder mount assembly similar to hydraulic mount assembly 120 can be used to actuate second fork 18. Hydraulic cylinder mount assembly 120 includes a mount 121 having a head end extension or neck portion 122 (FIG. 5), which is affixed to the head end 60' of cylinder 44' and which defines a reduced diameter portion 124. Neck portion 122 and reduced diameter portion 124 are symmetrical about axis 126 of hydraulic cylinder 60'. A load bearing 128 is disposed upon reduced diameter portion 124 and defines a truncated, spherical convex load bearing surface 130, which has a diameter 132 which is less than the diameter 133 of the cylinder 60'. Alternatively diameter 132 can be equal to or larger than diameter 133. The axis of symmetry of spherical surface 130 is colinear with axis 126. A bolt and washer arrangement 134 retains load bearing 128 on reduced diameter portion 124. Load bearing surface 130 is received by a truncated, spherical concave load bearing surface 136 on a load bearing 138. A mounting bracket 140 is secured to member 28' by means well known in the art, such as welding. Mounting bracket 140 and member 28' have a bore 141 which receives load bearing 138. Load bearing 138 is held therein between annular lip 142 of member 28' and annular ring 143 which is secured to bracket 140 by bolts 145.

The operation of hydraulic cylinder mount assembly 120 is as follows. When fork 16' (FIG. 4) is loaded, cylinder 44' can self-align itself through the pivoting of the spherical surface 130 to avoid any bending moments. Accordingly, the cylinder housing 44' and the rod 54' can be of less massive construction as cylinder 44' need not accommodate bending stresses which are developed in prior art cylinders.

Other aspects, objects and advantages of this invention can be obained from a study of the drawings, the disclosure and appended claims.

I claim:

1. In a mounting assembly (50) for a hydraulic cylinder (42) having a cylindrical, housing (66) and a rod (54), said housing (66) having first and second ends (52, 64), a longitudinal axis (81) and a predetermined outer diameter (100), and said rod (54) being positioned to extend from one of said first and second ends (52, 64) of said housing (66), the improvement comprising:

a bracket (102) having a first spherical load bearing surface (106) and being positioned at a location adjacent the one of said first and second ends (52, 64) of said housing (66) from which said rod (54) extends, said cylinder (42) movable relative to said bracket (102); and a mount (51) having a second spherical load bearing surface (96) and a longitudinal axis (80), said mount (51) being connected to the one of said first and second ends (52, 64) of said cylinder housing (66) from which the said rod (54) extends, said second spherical load bearing surface (96) having a diameter (98) less than the diameter (100) of said housing (66) and being engaged with said bracket (102) with said first and second spherical load bearing surfaces (106, 96) in contact with one another, and said longitudinal axis (80) being in line with axis (81), said mount (51) having a housing endcap (62), said second spherical load bearing surface (96) being connected to said endcap (62) and extending from said endcap (62) to a location spaced from the one of the said first and second ends (52, 64), said endcap (62) and said second spherical load bearing surface (96) having a bore (88), said rod (54) being positioned to extend through the bore (88).

2. The mounting assembly (50) as set forth in claim 1 wherein said first spherical load bearing surface (106) is concave and said second spherical load bearing surface (96) is convex.

3. In a mast (12) having a carriage (14) mounted on said mast (12), a side-shiftable load carrying fork (18), means (30, 32) for connecting the fork (18) to the carriage (14), a hydraulic cylinder (42) having a housing (66), a longitudinal axis (81), first and second ends (52, 64) and a predetermined diameter (100) and a rod (54), said rod (54) being positioned to extend from one of said first and second ends (52, 64), and means (48) for connecting the cylinder (42) to the fork (18), the improvement comprising:

a bracket (102) having a first spherical load bearing surface (106) and being connected to said carriage (14), said cylinder (42) movable relative to said bracket (102); and, a mount (51) having a second spherical load bearing surface (96) and a longitudinal axis (80), said mount (51) being connected to one of said first and second ends of said housing, said second spherical load bearing surface having a diameter less than the diameter of said housing and being engaged with said bracket with said first and second spherical load bearing surfaces in contact with one another, and said longitudinal axis (80) being in line with axis (81), said mount (51) having a housing endcap (62), said second spherical load bearing surface (96) being connected to said endcap (62), and extending from said endcap (62) to a location spaced from the one of the said first and second ends (52, 64), said endcap (62) and said second spherical load bearing surface (96) having a bore (88), said rod (54) being positioned to extend through the bore (88).

4. The mast (12) as set forth in claim 3 wherein said first spherical load bearing surface (106) is concave and said second spherical load bearing surface (96) is convex.

* * * * *